(12) United States Patent
Kies et al.

(10) Patent No.: US 7,011,494 B2
(45) Date of Patent: Mar. 14, 2006

(54) DUAL RETENTION VANE ARM

(75) Inventors: David O. Kies, East Hartford, CT (US); Phillip E. Alexander, Colchester, CT (US); Joshua D. Brumbaugh, Portland, CT (US)

(73) Assignee: United Technologies Corporation, Hartford, CT (US)

( * ) Notice: Subject to any disclaimer, the term of this patent is extended or adjusted under 35 U.S.C. 154(b) by 129 days.

(21) Appl. No.: 10/771,884

(22) Filed: Feb. 4, 2004

(65) Prior Publication Data

US 2005/0169741 A1 Aug. 4, 2005

(51) Int. Cl.
*F03D 7/00* (2006.01)
(52) U.S. Cl. .................. 415/148; 415/149.1; 415/160
(58) Field of Classification Search ............. 415/1, 415/130, 133, 149.1, 147, 151, 159, 160, 415/162, 156, 158, 148
See application file for complete search history.

(56) References Cited

U.S. PATENT DOCUMENTS

| | | | |
|---|---|---|---|
| 4,050,844 A | | 9/1977 | Miller et al. |
| 4,668,165 A | * | 5/1987 | Ludwick ..................... 415/148 |
| 4,755,104 A | | 7/1988 | Castro et al. |
| 4,767,264 A | | 8/1988 | Kisling et al. |
| 4,897,021 A | | 1/1990 | Chaplin et al. |
| 5,211,537 A | | 5/1993 | Langston et al. |
| 5,462,403 A | | 10/1995 | Pannone |
| 6,375,419 B1 | | 4/2002 | LeJambre et al. |

* cited by examiner

*Primary Examiner*—Edward K. Look
*Assistant Examiner*—Dwayne J White
(74) *Attorney, Agent, or Firm*—Carlson, Gaskey & Olds

(57) ABSTRACT

A variable vane arm is disclosed having dual retention capability to ensure vanes of a gas turbine engine remain connected to the vane arm even under surge loads or when fastener preload, or the entire fastener, is lost. The variable vane arm further provides a surge slot to facilitate rotation of the vane even when the vane is operating under surge or otherwise excessively high pressure conditions.

28 Claims, 6 Drawing Sheets

DUAL RETENTION VANE ARM

GOVERNMENT RIGHTS NOTICE

The Government has rights in this invention pursuant to Contract No. N00019-02-C-3003.

FIELD OF THE INVENTION

The present disclosure generally relates to gas turbine engines and, more particularly, relates to vanes and vane arms used within gas turbine engines.

BACKGROUND OF THE DISCLOSURE

Gas turbine engines are widely applied machines for generating power or thrust. Most typically, they are employed on modern aircraft to provide the propulsion necessary for flight. They may also be used onboard such aircraft for power generation in an APU (Auxiliary Power Unit) capacity to provide for onboard heating, cooling, and ventilation, as well as operational power and lighting systems onboard the aircraft within the cockpit, passenger cabin, and the like. They may also be used in landbased applications for generation of electrical power or mechanical horsepower in myriad vehicles and pieces of machinery.

In a typical gas turbine engine, three main sections are provided, namely, a compressor section, a combustion section, and a turbine section. Within the compressor section, ambient air is ingested, highly compressed, and directed through a downstream diffuser into the combustion section. Within the combustion section, the highly compressed air is mixed with fuel within an annular combustion chamber and burned at extremely high temperatures, generating massive levels of heat energy. Moreover, as opposed to internal combustion engines, wherein the ignition of the fuel is intermittent every two or four strokes of the engine, ignition within a gas turbine engine is continuous, thereby increasing the high power levels attainable by the engine.

From the combustion section, the extremely hot combustion gases are directed to the turbine section downstream of the combustion chamber. As both the turbine section and the compressor section are mounted on the same shaft assembly, rotation of the turbine blades, upon contact with the rapidly expanding and hot combustion gases, causes the shaft to which they are mounted to rotate and in turn causes the compressor blades, also mounted to the shaft, to rotate and thus complete the engine cycle. The discharge of the rapidly expanding hot gases at high velocities from the turbine causes the engine to generate the aforementioned thrust needed for aircraft operation.

Typical compressors and turbines include a plurality of blades mounted on the rotor or central shaft of the engine, and a plurality of vanes on an inner engine casing, sometimes referred to as a stator. Within the compressor section, the compression ratio achievable by modern day gas turbine engines is in excess of 40:1. Such compressors can also rotate in excess of 1,000 miles/hr. and ingest in excess of 2,600 lbs/air/sec. These attributes, when combined with the continuous flow and ignition of fuel indicated above, can result in the engine generating in excess of 250,000 hp, with exhaust gases exiting the engine at speeds in excess of 1,000 miles/hr, thereby enabling commercial aircraft to cruise at the slightly less than supersonic speeds at which modern travelers have become accustomed, and military aircraft to travel at Mach speeds necessary in modern warfare.

However, in order for such engines to operate optimally, the vanes of the compressor section, those extending both from the rotor and the engine casing, must be accurately dimensioned and mounted to ensure the incoming air is compressed as needed and does not simply flow axially through the engine. Moreover, it is often necessary for some of the vanes, typically those mounted on the engine casing, to be movable about a longitudinal axis. More specifically, such vanes are typically provided with a mounting stem or trunnion for connection to a vane arm. The vane arm is mounted so as to be rotatable and is connected to an actuator, such as a motor or other power source within the aircraft, so as to enable the vanes to rotate when the vane arm rotates.

In light of the above, one of ordinary skill in the art will readily understand that the mounting structure of the vane arm must be sufficiently robust to withstand the significant forces generated by the compressor section during not only normal operation, but when the engine experiences surge or other transients as well.

With prior art vane designs, vanes are typically mounted within vane arms using a retention device often referred to as a claw. In other words, the vane arm includes first and second appendages which wrap around the vane trunnion and insert into grooves or slots provided within the vane trunnion. A threaded fastener such as a bolt is then inserted through the vane arm and into the vane trunnion to provide additional attachment. Such a design provides a dual retention feature in that the claws are able to retain the vane in the event that the preload provided by the fastener is lost or when the entire fastener itself becomes dislodged from the vane arm. However, such a design is limited in the load conditions under which it can operate in that the claw arms tend to spread or cam away from the trunnion under high loads thereby causing the assembly to lose its capability for driving the vane to the correct angular orientation.

In another prior art design, it has therefore been known to provide a vane arm that drives the vane using an interference fit between the trunnion and the vane arm, with a loose fit being provided between another portion of the trunnion and a surge slot of the vane arm. Accordingly, when the vane arm assembly is placed under high loads and the interference fit begins to be lost due to deformation of the vane arm, the deformation causes the loose fitting area between the vane arm and trunion to tighten, thereby providing a secondary mechanism for driving the vane under higher loads. While such a design is effective in this regard, it does not provide dual retention features in the event of fastener or fastener preload loss, and it requires relatively heavy materials at added expense.

Within the context of aircraft, it is also important to understand that weight is always at a premium. The lighter the material is, the lighter the engine, and the lighter the engine, the lighter the aircraft will be. This directly translates into less fuel consumption and lower costs of operation. Designers have therefore been required to select materials which are sufficiently robust to withstand the aforementioned loads, while minimizing the weight being added to the aircraft. A still further complicating factor is that of cost. Quite often the materials which are sufficiently robust to withstand the loads encountered by the engine and still meet certain weight requirements, come at costs which make them unacceptable. Alternatively, they come at a cost which makes the overall engine cost more than is desirable.

In light of the foregoing, it can therefore be seen that a need exists for a vane arm mounting structure with improved retention capabilities even in the situation where fastener preload or the entire fastener are lost, and which can provide a mechanism by which the vane can be driven during both normal loads and surging. Moreover, it would be beneficial if such a design were to be provided wherein relatively inexpensive and light weight materials could be used in the place of materials which have traditionally been required.

SUMMARY OF THE DISCLOSURE

In accordance with one aspect of the disclosure, a variable vane arm is disclosed which may comprise a mounting head and an actuation lever. The mounting head may include a back plate and first and second claws extending away from the mounting head defining a vane receiving area wherein the vane receiving area includes first and second lateral slots and a surge slot. The actuator lever may extend from the mounting head.

In accordance with another aspect of the disclosure, a variable vane assembly is disclosed which may comprise a vane arm, and a vane connected to the vane arm. The vane arm may include a mounting head and an actuation lever extending from the mounting head wherein the mounting head includes a back plate from which first and second claws extend to thereby define a vane receiving area. The vane receiving area may include a surge slot, flanked by first and second lateral slots. The vane may include a vane stem with the first and second claws of the vane arm extending into first and second grooves in the vane stem. The vane stem may terminate in a vane trunnion which is received in the surge slot.

In accordance with another aspect of the disclosure, a gas turbine engine having a compressor section, combustion section, and a turbine section is disclosed wherein the compressor section includes a plurality of variable vane arms each comprising a mounting head and an actuation lever. The mounting head may include a back plate and first and second claws extending away from the mounting head and defining a vane receiving area. The vane receiving area may include first and second lateral slots and a surge slot, while the actuation lever may extend from the mounting head.

In accordance with another aspect of the disclosure, a variable vane assembly is disclosed which may comprise a vane arm, a vane, a first means of securing the vane to the vane arm, a second means of securing the vane to the vane arm, and means for ensuring the vane arm is able to drive the vane in the event that one of the first and second means for securing is inoperable.

These and other aspects and features of the disclosure will become more apparent upon reading the following detailed description when taken in conjunction with the accompanying drawings.

While the disclosure is susceptible to various modifications and alternative constructions, certain illustrative embodiments thereof have been shown in the drawings and will be described below in detail. It should be understood, however, that there is no intention to limit the present disclosure to the specific forms disclosed, but on contrary, the intention is to cover all modifications, alternative constructions, and equivalents falling within the spirit and scope of the disclosure as defined by the appended claims.

DETAILED DESCRIPTION OF THE DISCLOSURE

Figure 1:
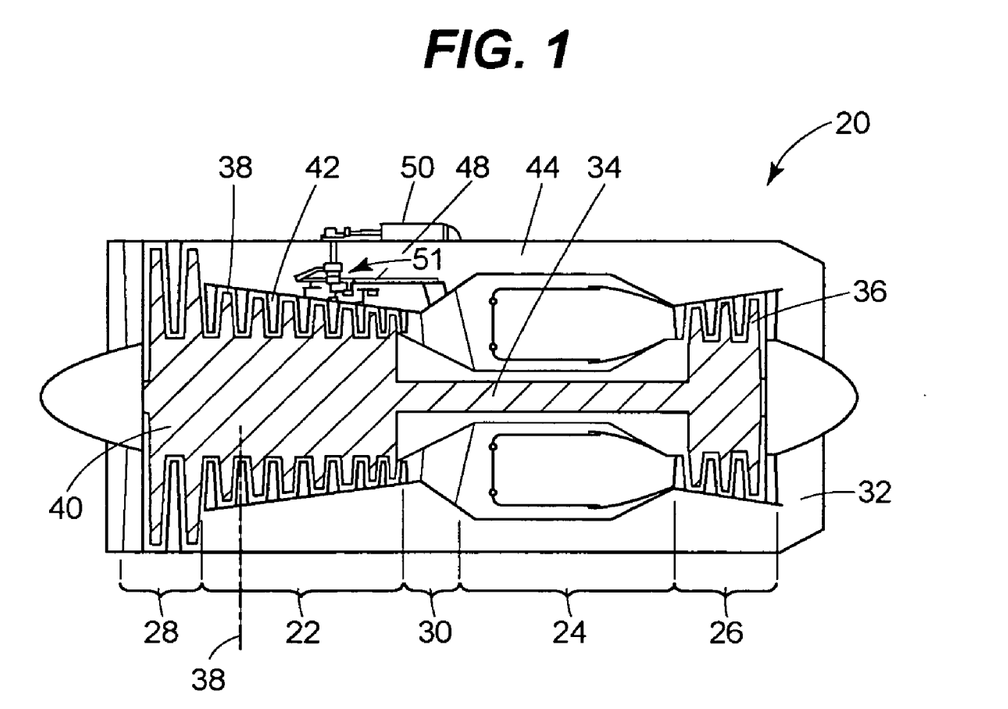
FIG. 1 is a sectional view of a gas turbine engine constructed in accordance with the teachings of the disclosure.

Referring now to the drawings, and with specific reference to FIG. 1, a gas turbine engine constructed in accordance with the teaching of the disclosure is generally referred to by reference numeral 20. While the following detailed description will be made and depicted in conjunction with the specific gas turbine engine identified herein, it is to be understood that the mounting structure of the vane arm assembly can be used in conjunction with any other form or design of gas turbine engine as well.

As depicted herein, the gas turbine engine 20 may include a compressor section 22, a combustion section 24, and a turbine section 26. Ambient air is ingested through the intake end 28 of the engine 20 and directed through the compressor section 22. The air is compressed within the compressor section 22 and directed through a diffuser 30 after which it is introduced into the combustion section 24 for ignition. A plurality of fuel injectors (not shown) inject fuel into the combustion section 24 at predetermined locations to provide for optimum primary, secondary, and tertiary combustions zones within the combustion section 24. The hot, rapidly expanding gases of combustion are then expelled through the turbine section 26 and through the exhaust end or nozzle 32 of the engine 20. As both the compressor section 24 and turbine section 26 are mounted on a common shaft 34, when the hot combustion gases are imparted against turbine blades 36 radiating from the shaft 34, the turbine blades 36 rotate which in turn causes the shaft 34 itself to rotate. Rotation of the shaft 34 in turn causes the compressor section 22 to rotate, thus perpetuating the engine cycle.

Within the compressor section 22, a plurality of blades 38 extend radially outwardly from a rotor 40 mounted to the shaft 34. Each of the blades 38 are precisely intermeshed with a plurality of vanes 42 extending radially inwardly from a stator or casing 44. Depending upon the operational demands of the gas turbine engine 20, each of the stator vanes 42 can be rotated upon its longitudinal axis 46 to thus allow for optimization of the compression ratio and flow rate through the engine 20. Through rotation of the stator vanes 42, the angle of attack of the axially flowing compressed air can be changed. This may be desirable based on a variety of engine operating parameters such as compressor rotational speed, air temperature, overall air pressure, etc.

Figure 2:
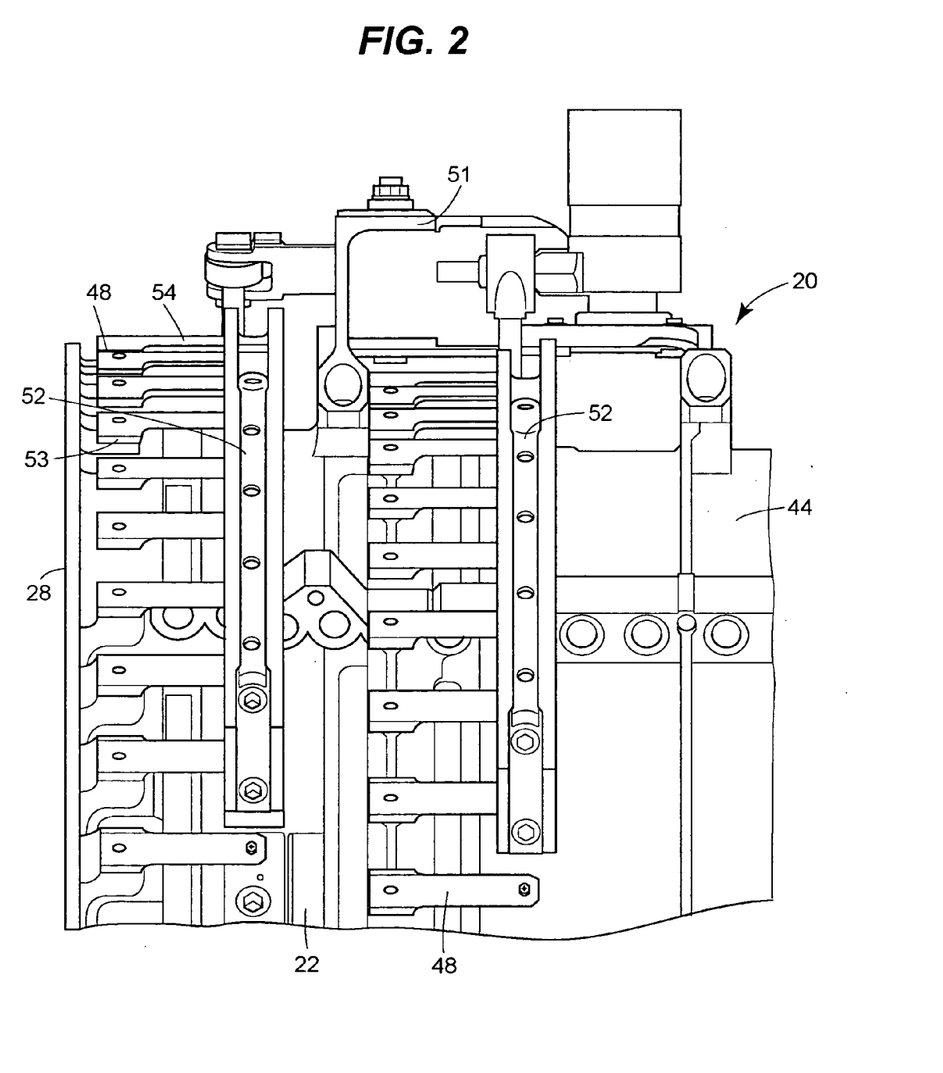
FIG. 2 is a perspective view of a drive mechanism and linkage system for a plurality of vane arms constructed in accordance with the teachings of the disclosure.
Figure 3:
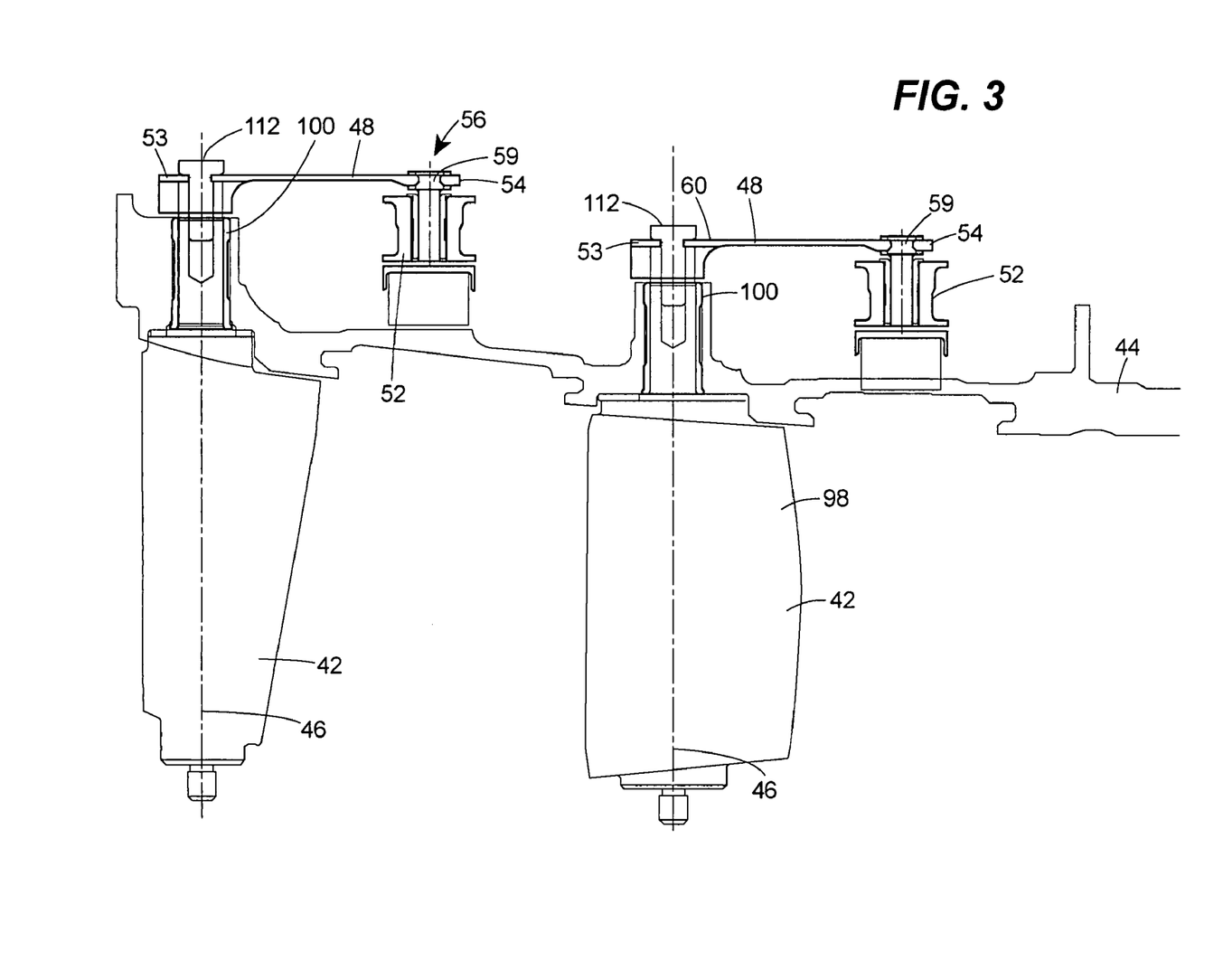
FIG. 3 is a plan view of two vane arm assemblies constructed in accordance with the teachings of the disclosure.

Turning now to FIGS. 2 and 3, it will be noted that each stator vane 42 is mounted within a rotatable vane arm 48. When rotation of one of the stator vanes 42 is desired, the vane arm 48 to which the particular vane 42 is mounted is rotated. To provide the motive force needed for such rotation each vane arm 48 is connected to an actuator 50. Energization of the actuator 50 causes movement of linkage 51, which in turn causes movement of a synchronization ring 52 extending circumferentially around the engine casing 44. As each of the vane arms 48 is pivotally connected to the synchronization ring 52, movement of the synchronization ring 52 causes movement of the vane arms 48, and thus vanes 42. Any number of different actuators and drive mechanisms, in addition to those depicted, may be employed, including, but not limited to, motors, gears, pulleys, linear actuators, solenoids, screw-drives, and the like. In addition, a number of synchronization rings 52 corresponding to the number of vane stages may be provided, with two rings and stages being depicted in FIG. 2.

Figure 4:
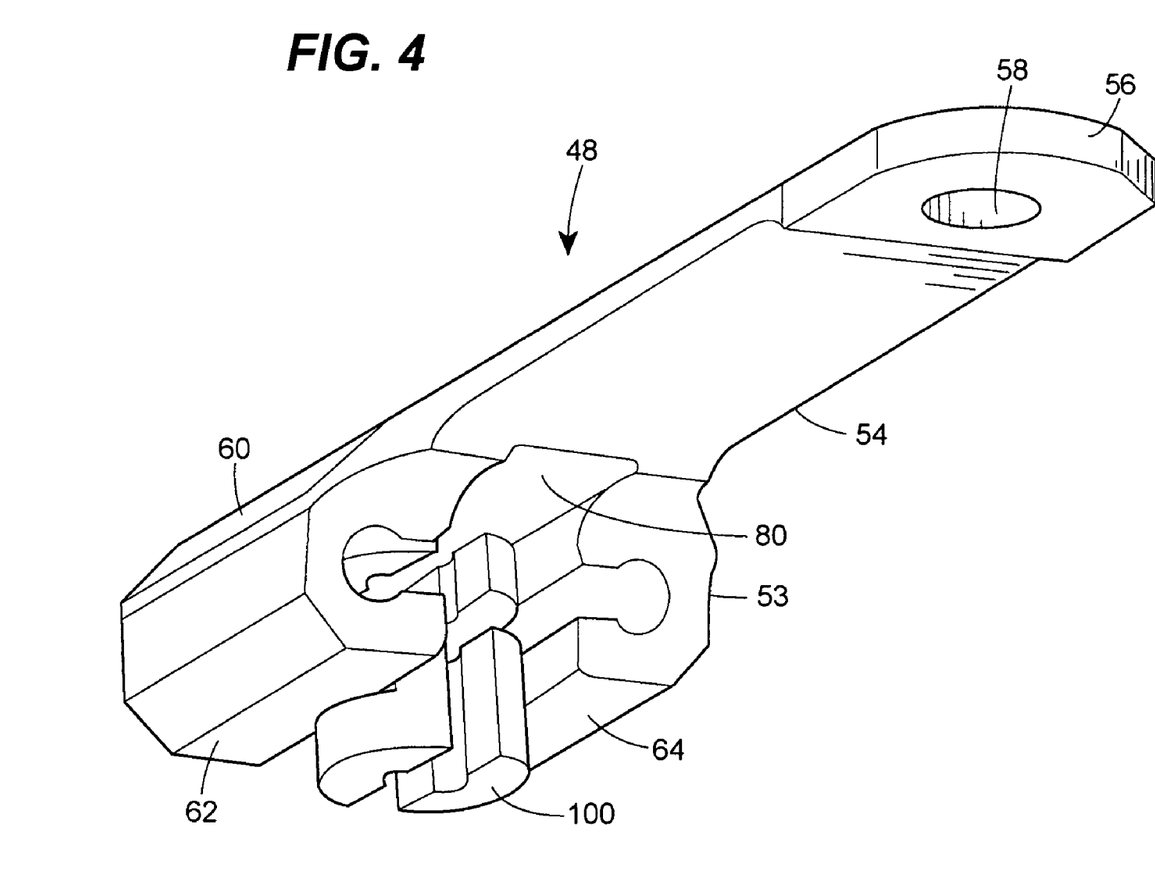
FIG. 4 is a perspective view of a vane arm constructed in accordance with the teachings of the disclosure.
Figure 5:
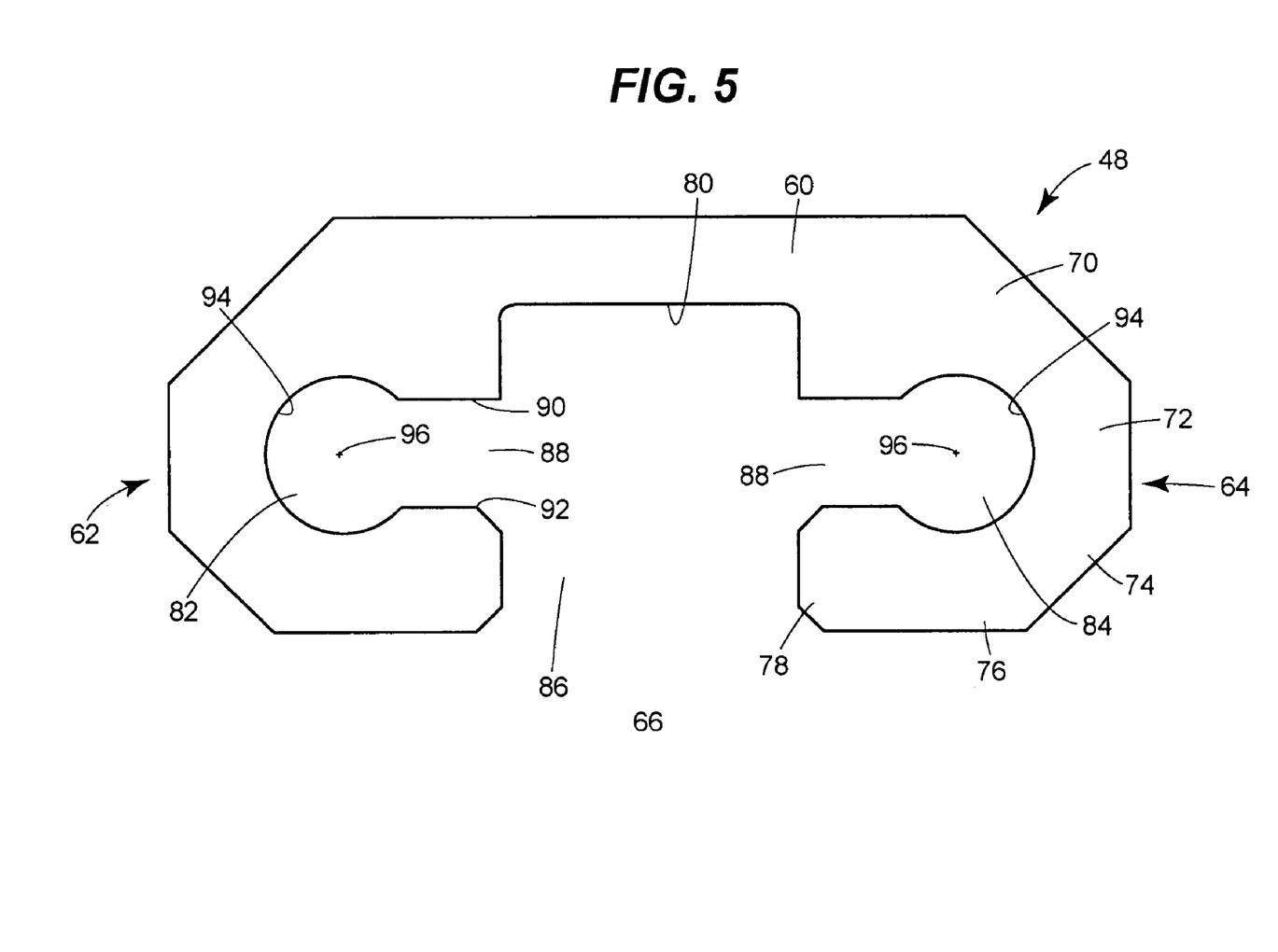
FIG. 5 is an end view of the vane arm of FIG. 2.

With reference now to FIGS. 3 and 4, the vane arm 48 is shown to include a mounting head or end 53 from which an actuation lever 54 extends. As will be noted, a distal end 56 of the actuation lever 54 includes an aperture 58 to facilitate attachment of the actuation lever 54 to the actuator 50. Any type of bolt, fastener, or linkage may be employed in this capacity with a pin 59 being depicted to enable pivotal movement with the synchronization ring 52. The mounting head 53 includes a back plate 60 from which first and second claws 62 and 64 extend, thereby defining a vane receiving area or recess 66 as shown in FIG. 5. It is within the vane receiving area 66 that a vane stem 68 of the vane 42 is received as will be described in further detail herein with respect to FIG. 5.

Figure 6:
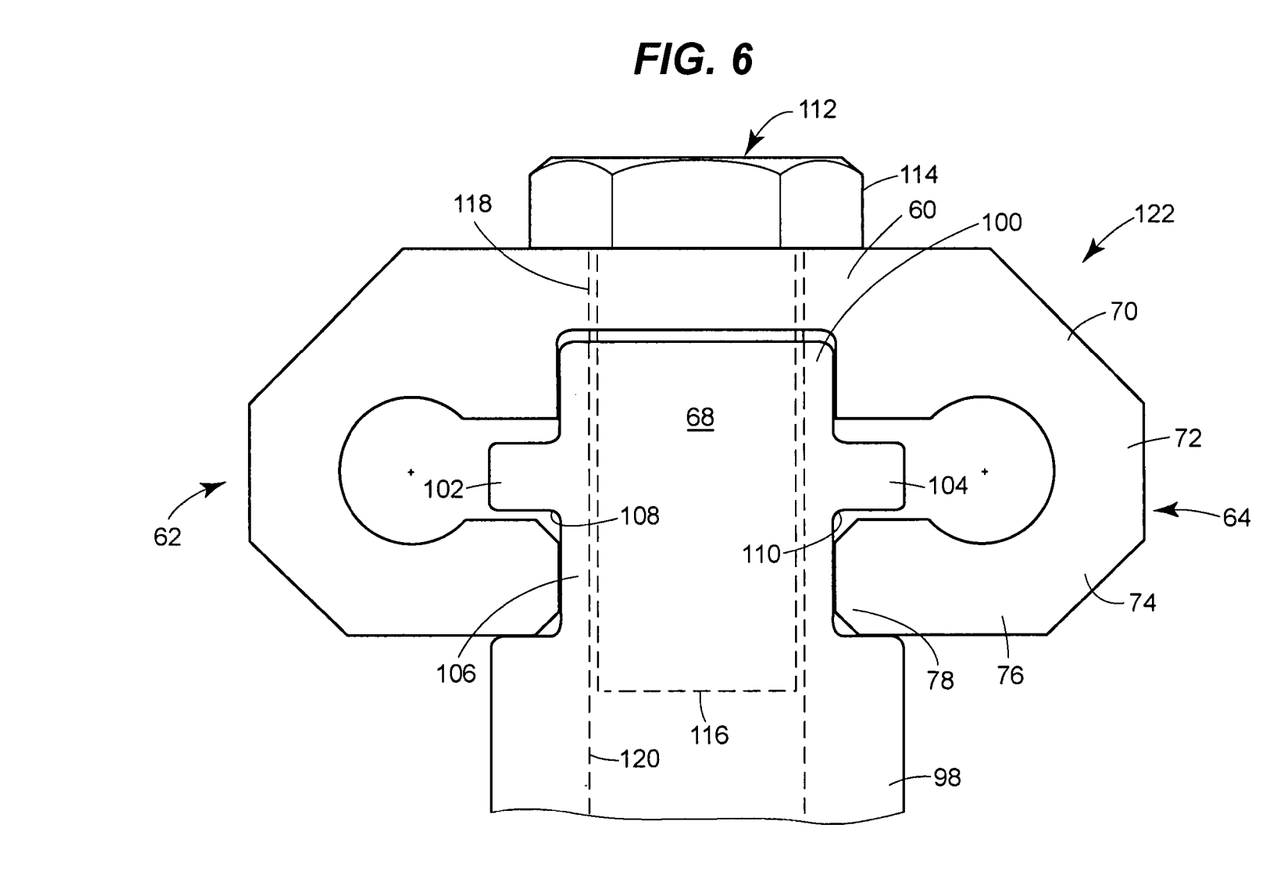
FIG. 6 is a end view of the vane arm of FIG. 2, but with a vane mounted therein.

With specific reference to first and second claws 62 and 64, as depicted best in FIGS. 5 and 6, such claws may be constructed to include four distinct sections including a first section 70 extending downwardly and angularly outwardly (with respect to the orientation of the figures) from the back plate 60, a second section 72 extending downwardly from the first section 70 and substantially perpendicular to the back plate 60, a third section 74 extending downwardly and angularly inwardly from the second section 72, and a fourth section 76 extending from the third section 74 and substantially parallel to the back plate 60. The fourth section 76 includes a relatively enlarged end 78, although the ends 78 need not be larger than any other section of the claws 62 and 64 as long as they provide an interference fit with the vane stem 68.

In the above described embodiment, the vane arm 48 is manufactured by machining metal stock, but it is to be understood that the arm may be made of sheet metal as well, cast metal, or the like. Also, in the depicted embodiment, the vane receiving area 66 is substantially cross-shaped in sectional view and includes a surge slot 80, first and second lateral slots 82 and 84, and a inlet 86. Both of the lateral slots 82 and 84 include necks 88 having substantially parallel sides 90, 92 leading to a substantially circular or cylindrically shaped void 94.

The stator vane 42 includes the vane stem 68 extending from a body or foil 98. More specifically, the vane stem 68 includes a trunnion 100, as well as first and second flats 102 and 104. The first and second flats 102 and 104 cooperate with a vane base 106 to form first and second claw slots 108 and 110 for receipt of first and second claws 62 and 64.

While the first and second claws 62, 64 form a first mechanism for securing the vane 42 to the vane 48, a further mechanism for securing the vane 42 to the vane arm 48 is provided by a fastener 112. The fastener 112 may be a threaded bolt having a head 114 and threaded stem 116 and may be inserted through the mounting head 53 and into the vane stem 68. To facilitate this attachment, an aperture 118 may be provided in the back plate 60 of the mounting head 53, and a threaded aperture 120 may be provided in the vane stem 68. In doing so, it can be seen that the claws combine with the fastener 112 to provide dual retention capabilities.

Given such structure, a vane arm assembly 122 can be constructed by first sliding the vane stem 68 into the vane arm 48. More specifically, the first and second flats 102 and 104 are positioned so as to be in alignment with first and second lateral slots 82 and 84, and trunnion surface 102 is aligned with the surge slot 80. The vane stem 68 is then slid on to the mounting head 53 until aperture 118 is aligned with aperture 120. In so doing, claws 62 and 64 slide into claw slots 108 and 110. Ends 78 of claws 62 and 64 are designed to ensure a closely tolerance fit with claw slots 108 and 110.

Once so positioned, the threaded fastener 112 can be installed with sufficient torque or preload to ensure assembly 122 is compressed. By rotating the fastener 112 not only is the vane stem 68 brought into tight engagement with the mounting head 53, but the claws 62 and 64 are caused to deflect toward the fastener head 114, thereby crimping the mounting head 53 around the flats 102 and 104.

In operation, the foregoing construction provides a number of advantageous features. One, by using a claw design, substantial structural interference between the claws and flats are provided to ensure connection between the vane and vane arm even under the high speeds and centrifugal forces to which these elements are typically subjected.

Two, by using a threaded fastener, the vane assembly is compressed under a predetermined preload to ensure a tight fit and second level or means of retention. Moreover, even if the preload on the fastener, or the entire fastener, is lost, the assembly will stay together due to the structural interference between the claws and the flats.

Three, as a result of the surge slot and close tolerances under which it and the vane trunnion are manufactured, the vane assembly has enhanced drive capabilities even under high surge or operating loads. More specifically, when trying to drive a vane to a specific angular orientation or hold a vane in such an orientation, the claws may tend to cam or bow away from the claw slots, thereby losing their interference fit. However, by providing a surge slot about the trunnion, when the claws outwardly deflect, the normally loose surge slot will constrict around the trunnion and provide a backup or secondary means for securely gripping the trunnion and ensuring the vane can be driven and/or accurately held during such high loads. In doing so, it can be seen the surge slot is movable or deformable between first and second positions. In the first position, when the vane is operating under normal load conditions, and the claws adequately grip the vane stem, the surge slot is relatively loosely disposed about the vane trunnion. In the second position, when the vane is operating under surge or otherwise high loads, the surge slot tightly grips the vane trunnion to enable the vane to be moved to, and held at, the desired angular position.

Four, stemming from all of the above advantages, the vane assembly of the present disclosure can be made from lighter weight materials such as titanium, than has heretofore been possible. Morever, since the surge slot ensures operability even if the claws begin to cam out of their respective slots, the vane trunnions and vane arm claws can be made shorter and from less material, thereby reducing weight, size, and cost.

Five, using such a design the entire vane assembly can be milled as opposed to broached. Since the vane arm assembly can be milled all over, flexibilities and cost savings are attained over prior designs.

From the foregoing, it can be appreciated that the present disclosure provides a vane arm assembly having enhanced vane retention features and drive capability even under surge conditions or wherein a fastener of the vane arm assembly or preload on the fastener is diminished or entirely lost.

What is claimed is:

1. A variable vane arm, comprising:

a mounting head having a back plate and first and second claws extending away from the mounting head defining a vane receiving area, the vane receiving area including first and second lateral slots and a surge slot;

an actuation lever extending from the mounting head; and a fastener extending through said back plate, and for being attached to a vane received in said vane receiving area.

2. A variable vane arm, comprising:

a mounting head having a back plate and first and second claws extending away from the mounting head defining a vane receiving area, the vane receiving area including first and second lateral slots and a surge slot;

an actuation lever extending from the mounting head; and the vane receiving area is substantially cross-shaped.

3. The variable vane arm of claim 1, wherein the surge slot is flanked by the first and second lateral slots.

4. The variable vane arm of claim 1, wherein the mounting head and actuation lever are manufactured from titanium.

5. The variable vane arm of claim 1, wherein the back plate includes an aperture for passage of said fastener.

6. A variable vane arm, comprising:

a mounting head having a back plate and first and second claws extending away from the mounting head defining a vane receiving area, the vane receiving area including first and second lateral slots and a surge slot;

an actuation lever extending from the mounting head;

the surge slot being movable between first and second positions; and the surge slot being loosely disposed about the vane stem in the first position, and tightly grips the vane stem in the second position.

7. A variable vane arm assembly, comprising:

a vane arm having a mounting head and an actuation lever extending from the mounting head, the mounting head including a back plate from which first and second claws extend defining a vane receiving area, the vane receiving area including a surge slot flanked by first and second lateral slots; and a vane connected to the vane arm, the vane having a vane stem, the first and second claws of the vane arm extending into first and second grooves in the vane stem, the vane stem terminating in a vane trunnion, the vane trunnion received in the surge slot of the vane arm.

8. The variable vane arm assembly of claim 7, further including a fastener connecting the vane arm to the vane.

9. The variable vane arm assembly of claim 8, wherein the fastener is a threaded bolt.

10. The variable vane arm assembly of claim 9, wherein the threaded bolt applies a predetermined preload to vane assembly.

11. The variable vane arm assembly of claim 7, wherein the vane arm is manufactured from titanium.

12. The variable vane arm assembly of claim 7, wherein the vane stem further includes first and second flats engaging the first and second claws of the vane arm.

13. The variable vane arm assembly of claim 7, wherein the surge slot is movable between a first position loosely disposed about the vane trunnion, and a second position tightly gripping the vane trunnion.

14. A gas turbine engine, comprising:

a compressor section;

a combustion section;

a turbine section; and a plurality of variable vane arms mounted within the compressor section, each arm including a mounting head having a back plate and first and second claws extending away from the back plate defining a vane receiving area, the vane receiving area including first and second lateral slots and a surge slot, the variable vane arm further including an actuation lever extending from the mounting head, and a fastener extending through each arm, and through said back plate, into a vane received in said vane receiving area.

15. A gas turbine engine, comprising:

a compressor section;

a combustion section;

a turbine section;

a plurality of variable vane arms mounted within the compressor section, each arm including a mounting head having a back plate and first and second claws extending away from the back plate defining a vane receiving area, the vane receiving area including first and second lateral slots and a surge slot, the variable vane arm further including an actuation lever extending from the mounting head; and the vane receiving area being substantially cross-shaped.

16. The gas turbine engine of claim 14, wherein the surge slot is flanked by the first and second lateral slots.

17. The gas turbine section of claim 14, wherein the mounting head and actuation lever are manufactured from titanium.

18. The gas turbine engine of claim 14, wherein the back plate includes an aperture.

19. A variable vane arm assembly, comprising:

a vane arm adapted to be secured to an actuator;

a vane mounted in the vane arm;

a first means for securing the vane to the vane arm;

a second means for securing the vane to the vane arm; and means for ensuring the vane arm is able to drive the vane in the event one of the first and second means for securing is inoperable.

20. The variable vane arm assembly of claim 19, wherein the first means for securing is a claw.

21. The variable vane arm assembly of claim 19, wherein the second means for securing is a bolt.

22. The variable vane arm assembly of claim 21, wherein the means for ensuring is a surge slot provided within the vane arm.

23. The variable vane arm assembly of claim 19, wherein the surge slot is movable between a first position loosely disposed around the vane trunnion and a second position tightly gripping the vane trunnion.

24. A method of operating a variable vane assembly, comprising:

gripping a vane to a vane arm using first and second claws which wrap around vane stem flats and into vane stem grooves;

applying a preload to the vane and vane arm by attaching a threaded fastener therebetween; and rotating the vane about a longitudinal axis by rotating the vane arm, a surge slot of the vane arm being loosely disposed about a trunnion of the vane stem when rotating under normal conditions.

25. The method of operating a variable vane assembly of claim 24, wherein the vane arm rotates the vane even when the preload is lost.

26. The method of operating a variable vane assembly of claim 24, wherein the surge slot drivingly engages the trunnion of the vane stem when rotating under surge loads.

27. The variable vane arm of claim 1, wherein said fastener is threaded.

28. The gas turbine engine of claim 14, wherein said fastener is threaded.

* * * * *